US010229683B2

(12) United States Patent
Leeb

(10) Patent No.: US 10,229,683 B2
(45) Date of Patent: Mar. 12, 2019

(54) SPEECH-ENABLED SYSTEM WITH DOMAIN DISAMBIGUATION

(71) Applicant: SoundHound, Inc., Santa Clara, CA (US)

(72) Inventor: Rainer Leeb, San Jose, CA (US)

(73) Assignee: SoundHound, Inc., Santa Clara, CA (US)

( * ) Notice: Subject to any disclaimer, the term of this patent is extended or adjusted under 35 U.S.C. 154(b) by 0 days.

(21) Appl. No.: 15/456,354

(22) Filed: Mar. 10, 2017

(65) Prior Publication Data

US 2018/0261216 A1    Sep. 13, 2018

(51) Int. Cl.
   *G10L 15/22* (2006.01)
   *G10L 15/02* (2006.01)
   *G10L 15/18* (2013.01)

(52) U.S. Cl.
   CPC ............ *G10L 15/22* (2013.01); *G10L 15/02* (2013.01); *G10L 15/18* (2013.01); *G10L 2015/221* (2013.01)

(58) Field of Classification Search
   CPC ................. G06F 17/30976; G06F 17/30734
   USPC ............................................................ 704/9
   See application file for complete search history.

(56) References Cited

U.S. PATENT DOCUMENTS

| 2003/0123618 | A1* | 7/2003 | Bhargava | H04M 3/4938 379/88.01 |
| 2006/0074832 | A1* | 4/2006 | Gardner | G06N 5/02 706/45 |
| 2006/0074836 | A1* | 4/2006 | Gardner | G06N 5/02 706/60 |
| 2009/0037237 | A1* | 2/2009 | Weber | G06Q 10/06 705/7.11 |
| 2009/0112903 | A1* | 4/2009 | Liang | G06F 17/30569 |
| 2010/0106552 | A1* | 4/2010 | Barillaud | G06Q 10/06 705/7.14 |
| 2010/0299336 | A1 | 11/2010 | Bergstraesser et al. | |

(Continued)

OTHER PUBLICATIONS

Google, Cloud Speech API Basics, Google Cloud Platform, Jan. 19, 2017, 14 pages.

(Continued)

*Primary Examiner* — Jakieda R Jackson
(74) *Attorney, Agent, or Firm* — Haynes Beffel & Wolfeld LLP; Ernest J. Beffel, Jr.; Andrew L. Dunlap

(57) ABSTRACT

Systems perform methods of interpreting spoken utterances from a user and responding to the utterances by providing requested information or performing a requested action. The utterances are interpreted in the context of multiple domains. Each interpretation is assigned a relevancy score based on how well the interpretation represents what the speaker intended. Interpretations having a relevancy score below a threshold for its associated domain are discarded. A remaining interpretation is chosen based on choosing the most relevant domain for the utterance. The user may be prompted to provide disambiguation information that can be used to choose the best domain. Storing past associations of utterance representation and domain choice allows for measuring the strength of correlation between uttered words and phrases with relevant domains. This correlation strength information may allow the system to automatically disambiguate alternate interpretations without requiring user input.

14 Claims, 13 Drawing Sheets

(56) References Cited

U.S. PATENT DOCUMENTS

| | | | |
|---|---|---|---|
| 2012/0084281 A1* | 4/2012 | Colosi | H04L 29/12632 |
| | | | 707/723 |
| 2013/0024801 A1* | 1/2013 | Leydon | G06F 17/30253 |
| | | | 715/780 |
| 2014/0096035 A1* | 4/2014 | Hall | G06F 3/01 |
| | | | 715/753 |
| 2014/0365209 A1* | 12/2014 | Evermann | G06F 17/279 |
| | | | 704/9 |
| 2015/0340033 A1 | 11/2015 | Di Fabbrizio et al. | |
| 2015/0382047 A1 | 12/2015 | van Os et al. | |
| 2016/0098393 A1* | 4/2016 | Hebert | G06F 17/28 |
| | | | 704/9 |
| 2016/0225370 A1* | 8/2016 | Kannan | G10L 15/22 |
| 2017/0295187 A1* | 10/2017 | Havelka | H04L 63/1483 |

OTHER PUBLICATIONS

Chiori Hori, et al., Deriving Disambiguous Queries in a Spoken Interactive ODQA System, Proceedings (ICASSP '03), Apr. 6, 2003, 4 pages.

Todd Mozer, Speech's Evolving Role in Consumer Electronidcs . . . From Toys to Mobile, Mobile Speech and Advanced Natural Language Solutions, Feb. 3, 2013, p. 29, Springer Science & Business Meida.

* cited by examiner

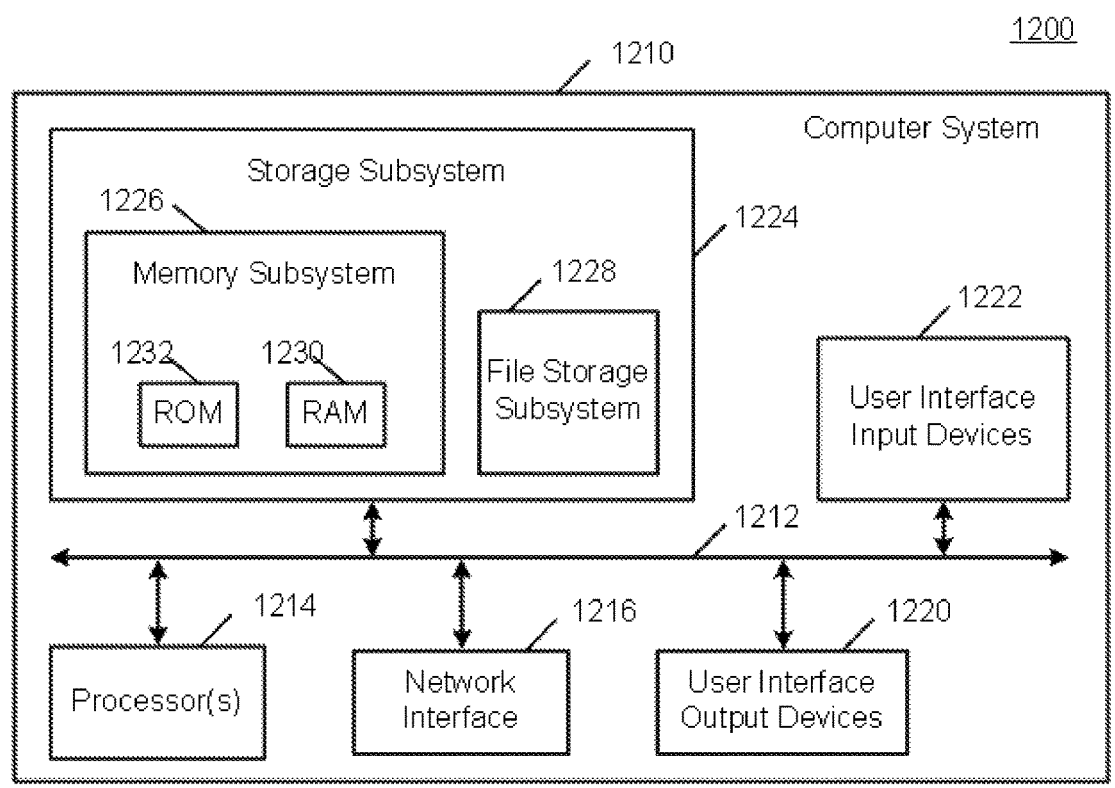
FIG. 12 – Computer System

SPEECH-ENABLED SYSTEM WITH DOMAIN DISAMBIGUATION

FIELD OF THE INVENTION

The present invention is in the field of speech-enabled systems that process natural language utterances. Specifically, the disclosure addresses speech interaction to disambiguate a spoken query.

BACKGROUND

It is increasingly common that computerized systems can process natural language utterances made by humans. Web search engines, for example, accept natural language textual input, process it, and provide visual results. Such systems generally provide a large number of results, such as 10, simultaneously in a browser window. The results can include pictures and text. Such systems might also display some advertisements. Visual human machine interfaces can provide rich and varied results with much information that users can consume relatively quickly.

Speech-enabled systems are ones in which users interact with machines, providing input by speaking natural language utterances. Such machines generally use automatic speech recognition and natural language processing techniques to interpret utterances. Many speech enabled systems also output generated speech, though some do not. The rate of information transfer through speech is much lower than with visual displays. It would take a long time for a system to speak all of the results that browser-based search engines provide in response to input of a single natural language expression. It would take so long that it would be impractical for users to interact with such machines by speech alone.

Many visual systems, in response to expressions with ambiguous meaning, display results appropriate to each of multiple reasonable interpretations of the utterances. It is, in most cases, impractical for speech-enabled systems to provide appropriate results to ambiguous utterances. Conventional speech-enabled systems, when faced with an ambiguous utterance, guess at the best interpretation in order to form their result. Frequently, the guessed interpretation is not the interpretation that the user intended. This is a common cause of frustration for users of conventional speech-enabled systems.

In addition, the use of visual displays for disambiguating the meaning of a speech utterance is not practical in many situations such as for a device that has no display or a device that must be operated without needing eye contact.

SUMMARY OF THE INVENTION

Various embodiments of the present invention are systems and methods that provide a more natural, conversational user interface. They interpret utterances in relation to multiple possible subject areas (domains of conversation). If an utterance is sensible in multiple domains, a system responds to the user with a list of domains, or words indicative of the domains, and then prompts the user to indicate which domain they intended. For example, in response to an utterance, "Where was Paul Simon born?", some embodiments would respond, "Paul Simon the musician or Paul Simon the politician?". If the next utterance indicates an interest in a musician (i.e. a music domain) or politician (i.e. a politics domain) then the system produces a result accordingly.

Some embodiments respond in various natural, human-like, ways. In response to a nonsense utterance, some embodiments indicate that it does not understand. In response to a vague utterance, some embodiments ask for clarification. In response to a sensible utterance that requires more information, such as, "Make a phone call", some embodiments respond with a request for the missing information, such as, "Who do you want to call?" In response to an utterance with only one sensible meaning, some embodiments give the likely intended result. In response to an utterance with very few likely interpretations, such as, "Where was Paul Simon born?", some embodiments respond with multiple results, such as "Paul Simon the singer was born in Newark, N.J., and Paul Simon the politician was born in Eugene, Oreg." In response to an utterance having many interpretations, such as, "What's the weather in Sunnyvale?", some embodiments respond with a list of options and a request for the user to disambiguate, such as, "Do you mean Sunnyvale Calif., Sunnyvale Tex., Sunnyvale N.C., Sunnyvale Mo., or Sunnyvale Nova Scotia?"

Some embodiments gather statistics about users' choices of domains, such as by counting the number of times each domain is chosen. Some embodiments count domain choices generally across many users, whereas other embodiments count domain choices for each individual user. Some embodiments count the chosen domain with a specific counter for each combination of domains offered for disambiguation.

BRIEF DESCRIPTION OF THE DRAWINGS

FIG. 12 illustrates a block diagram of a computer system, according to an embodiment of the invention.

DETAILED DESCRIPTION

Terminology and Introduction

Utterances are spoken natural language expressions, in contrast to textual natural language expressions.

Users provide input to speech-enabled systems by speaking natural language utterances.

Systems receive utterances, such as through microphones, and perform speech recognition. Furthermore, systems perform natural language processing to interpret utterances and produce interpretations. The process of interpretation is one of applying grammar rules on the words in the spoken utterance. The resulting interpretation is an instance of a data structure that represents the speaker's intent.

A domain of conversation represents a subject area, and comprises a set of grammar rules. The process of interpreting an utterance within a domain produces exactly one interpretation data structure instance. Different interpretations arise when systems interpret an utterance in the context of different domains of conversation. Each interpretation represents the meaning of the utterance as interpreted by a domain. Users make requests, such as asking "What time is it?" or directing the system to "Send a message." Systems provide responses, such as by speaking the time. Systems also make requests of users, such as by asking, "To whom would you like to send a message?", and in reply, users respond, such as by replying, "Mom." Sequences of one or more requests and responses produce results such as sending a message or reporting the time of day.

Basic Method

Various embodiments use computers that execute software stored on computer-readable media. Some embodiments comprise a single device. Some embodiments comprise a server, coupled, via a network, to a client that provides a direct speech interface to a user. Such embodiments receive utterances from the client.

Figure 1A:
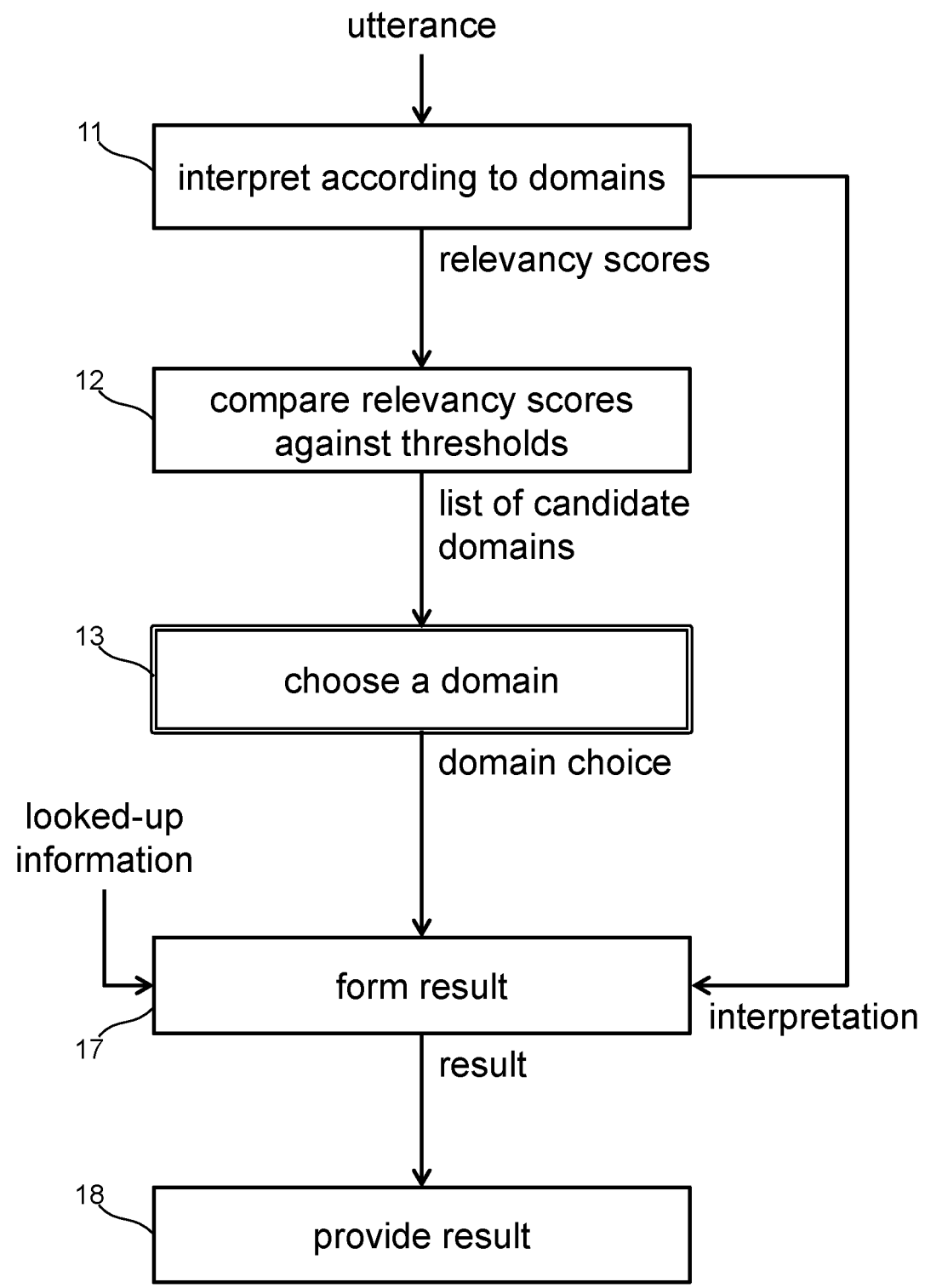
FIG. 1A is a flow diagram that illustrates an overview of a method for providing a result to a user utterance in a speech-enabled system, according to an embodiment of the invention.

FIG. 1A is a flow diagram that illustrates an overview of a method for providing a result of a user utterance in a speech-enabled system, according to an embodiment of the invention. In step 11, an utterance is received and interpreted by a natural language understanding system. The system transforms an audio signal representation of an utterance into a long phoneme sequence. It proceeds to tokenize the phoneme sequence. In some embodiments the system transcribes the tokenization into text of the spoken utterance. The system proceeds to interpret the tokenized phoneme sequence according to the semantic grammar rules of a multiplicity of domains to create, for each domain, an interpretation data structures that represents the utterance in the context of the domain.

The speech-enabled system may determine one or more domains of conversation in the context of which the utterance is sensible. Each utterance has exactly one interpretation in each domain. Some embodiments wait for an interpretation to be chosen as the one that the user intended before producing a result, such as an action, for the utterance. For example, for an utterance with an interpretation that requests a geographical fact and another interpretation that requires looking the weather conditions, such embodiments do not lookup the weather conditions until that interpretation is chosen over the other. By only forming a result for the chosen interpretation, such systems save processing effort, delay, power consumption, and expense to pay for access to data. However, an application required to respond to an utterance extremely quickly, and which executes on a highly parallel system, may form a result for multiple interpretations, then only provide the result corresponding to the selected interpretation.

In step 11, each interpretation is evaluated for how sensible the utterance is within the domain. For example, for an utterance, "It's raining!", a system would assign a high relevancy score in a weather domain but a low relevancy score in a cooking domain. The system does this by interpreting the utterance according to grammar rules in each domain. Grammar rules define words relevant to the domain and their meanings. A domain about weather has grammar rules that define meanings for the word "raining" in various combinations with other words. Domain about cooking does not define meanings for the word "raining". When systems interpret utterances according to grammar rules, they compute scores that indicate how relevant the domain is to understanding the utterance. For example, in a domain about telephone calls, "Dial Michelle." would have a high score because it is a very common way to phrase a command, where as "Connect to Michelle." would have a somewhat lower score because it is a less common way to phrase a phone call command. In a social network domain, "Connect to Michelle." would have a high score, but "Dial Michelle." would have a quite low score since it is an quite unusual way to phrase a command about social media.

Step 12 compares the relevancy score assigned to each domain against a threshold associated with the domain. All domains may be configured to use the same threshold, or thresholds may be configured differently across domains. Domains having an interpretation relevancy score that exceeds the domain threshold are added to a list of candidate domains. That is, only interpretations created from these domains are candidates for being chosen as the most likely correct interpretation of the utterance. Domains not having an associated interpretation with a relevancy score higher than the domain threshold may be removed from consideration at this point in the flow.

Some embodiments correlate historical records of past utterances with the chosen domain. This is useful for calibrating the relevancy scoring function. Various embodiments extract keywords from an utterance and store the extracted keywords with the domain choice for the utterance. A frequency count may be maintained for each domain choice associated with a keyword. When a new utterance is received, the system looks up the new utterances' keywords to find a list of domains chosen for each keyword in prior utterances, then use the frequency information to weight domains on the list of candidate domains. Some such embodiments, either directly, or as a result of weighting domain choices, use the domain choice frequency information to choose a domain automatically without asking the user. Use of domain choice frequency information may be used to choose a domain from a list of candidate domains without asking the user for additional Step 13 is shown in more detail in FIG. 1B and FIG. 4, which illustrate different embodiments for disambiguating an utterance based on domain. Step 13 uses the list of candidate domains and their associated interpretations to choose a domain for the interpretation. In an embodiment, step 13 may choose more than one domain, and in such an embodiment, the remaining steps are performed on all of the chosen domains.

Step 17 uses interpretation of the utterance in the chosen domain to form a result. Some embodiments form multiple results according to an interpretation in each of multiple domains. If the utterance is interpreted as a request for information, then step 17 may include looking up the requested information and preparing a result containing the looked-up information. If the utterance is a request for action, such as to change some aspect in the environment (lower the thermostat, play a piece of music, remind me to pick up the dry cleaning) then a command may be executed to perform the requested action, and a result indicating the completion status of the action may be prepared for presentation to the speaker. In step 18, the result prepared in step 17 is presented to the speaker. In an embodiment in which multiple domains are chosen in step 13, there may be multiple results provided in response to the utterance. Some embodiments provide the result as speech audio. Some embodiments provide the result as text, which a client or user interfacing device might send to a text-to-speech (TTS) module. Some embodiments send marked up text, using a language such as Speech Synthesis Markup Language (SSML) to indicate attributes of the result, such as word emphasis and speed.

Some embodiments provide results in ways other than a speech to the user. For example, some embodiments that send messages, in response to a request to send a message, provide results to message recipients. Some embodiment that change thermostat settings provide results by adjusting the thermostat without any spoken message to the user.

Figure 1B:
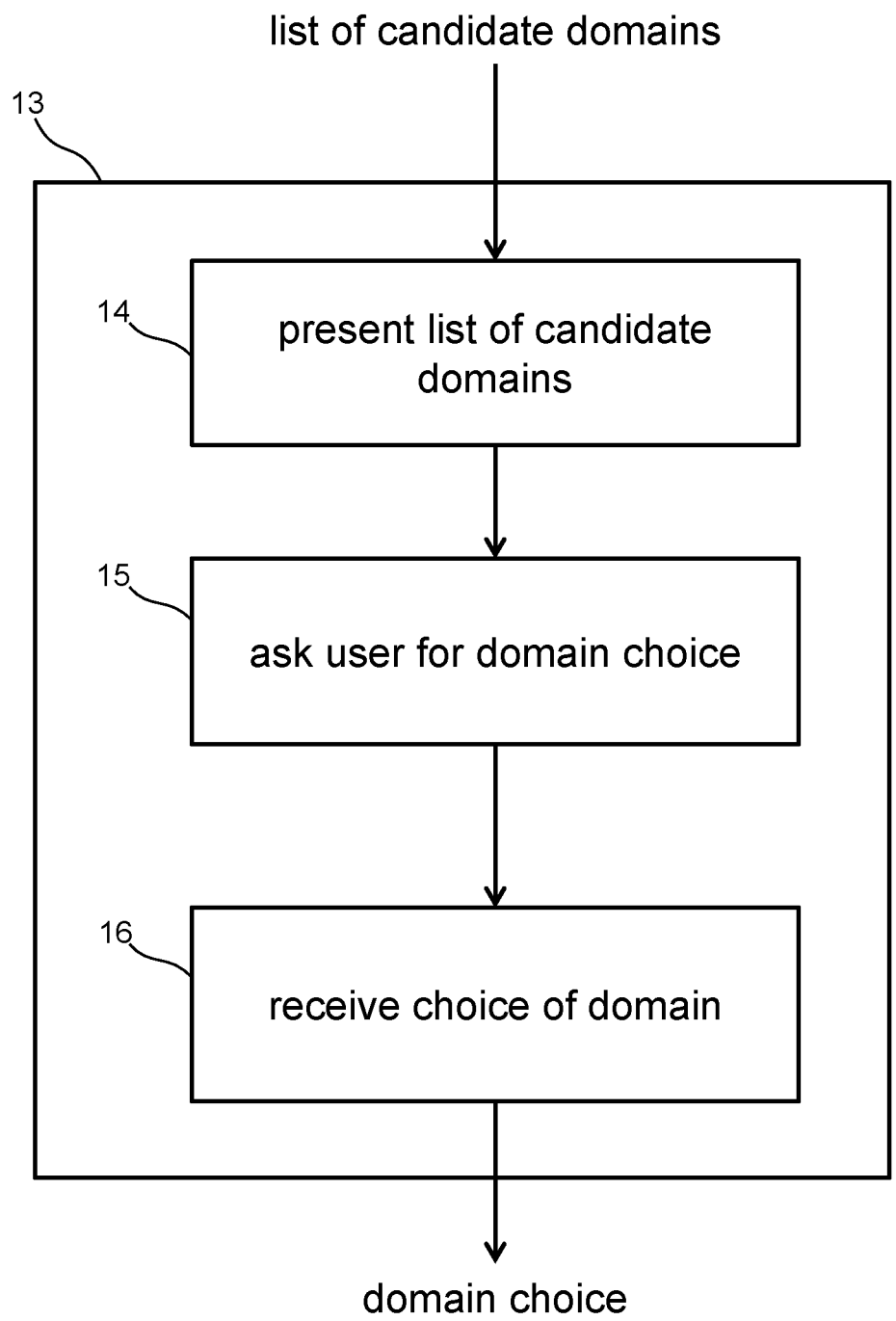
FIG. 1B is a flow diagram that illustrates a method, within the overall flow illustrated in FIG. 1A, of disambiguating interpretations of the utterance based on domains, according to an embodiment of the invention.

FIG. 1B is a flow diagram that illustrates a method, within the overall flow illustrated in FIG. 1A, of disambiguating interpretations of the utterance based on domains, according to an embodiment of the invention. The flow illustrated in FIG. 1B is an embodiment for performing step 13 in FIG. 1A. Step 14 presents the list of candidate domains to the user. Some embodiments present a list that simply names domains, such as, "Did you mean music or politics?" Some embodiments respond with lists that include information more specific to the utterance than just a domain name, such as "Did you mean Paul Simon the singer-songwriter or Paul Simon the former congressman from Illinois?"

Step 15 asks the user to choose a domain, then waits for a response with a choice. In step 16 the system receives the user choice. If the choice response includes information conceptually related to a domain from the list, such as, "the one who ran for president", the system proceeds in steps 16 and 18 to form a result using the interpretation created in the context of the related domain.

If the choice response includes information conceptually related to more than one of the listed domains, such as, "the one who was popular in the 1980s", (both Paul Simon the singer-songwriter and Paul Simon the politician were popular in the 1980s) the system will repeat the steps of presenting a list and asking for a choice. FIG. 1B does not illustrate repeating the user prompt. If the choice response includes no information conceptually related to any domain from the list, such as, "What's the weather forecast?", the system aborts the process of disambiguation, proceeds to treat the choice response as a new utterance, and restarts from step 11.

Collecting Data

It can be useful to collect data and compute statistics about the domain choices that users make. Some embodiments adjust the relevancy scores of domains in favor of domains that users frequently choose when certain words are present in utterances. For example, if users, when presented a list of domains to disambiguate the utterance, "Toyota Tacoma", tend to choose consumer reviews rather than auto dealerships or a manufacturer's web site, then such systems increase the score of grammar rules about consumer reviews when the term, "Toyota Tacoma" is present in an utterance. As a result, such systems identify strong correlations between certain utterances and domains. If the strengths are very high, such a system will not need to ask users to disambiguate since the user's intention is clear.

As meaning of words and phrases can evolve, some embodiments comprise a reversal mechanism. In some scenarios, a particular domain becomes a default. For example, consumer reviews for the utterance "Toyota Tacoma". Embodiments with a reversal mechanism account for users responding with negative feedback. To gather negative feedback, various embodiments: recognize negative keywords in speech, provide thumbs-up/thumbs-down buttons for users, or monitor other user behaviors. When user feedback indicates displeasure with results, if the utterance produced multiple highly-scored domain hypotheses, but the system always chose one domain, the reversal mechanism changes the utterance type back to being treated as ambiguous.

Figure 2A:
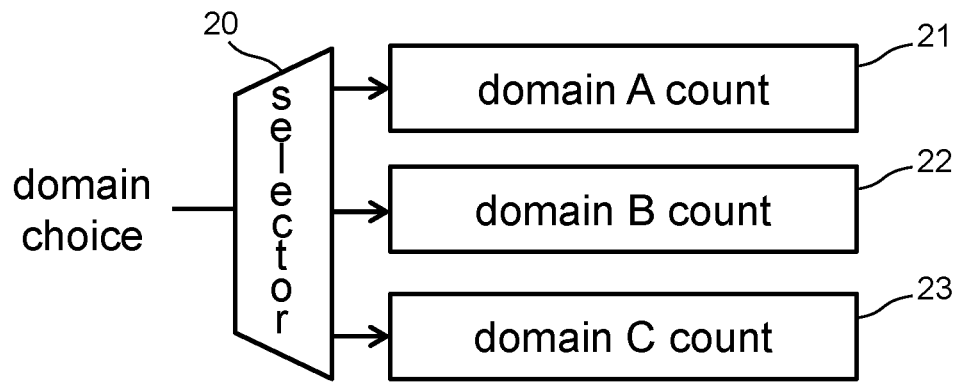
FIGS. 2A-2B illustrate incrementing counters for chosen domains, according to an embodiment of the invention.

FIG. 2A shows gathering statistics according to an embodiment. Each time a user makes a domain choice, the system increments one of a multiplicity of counters identified by selector 20. This system has a counter for each of three domains: domain A 21, domain B 22, and domain C 23.

Figure 2B:
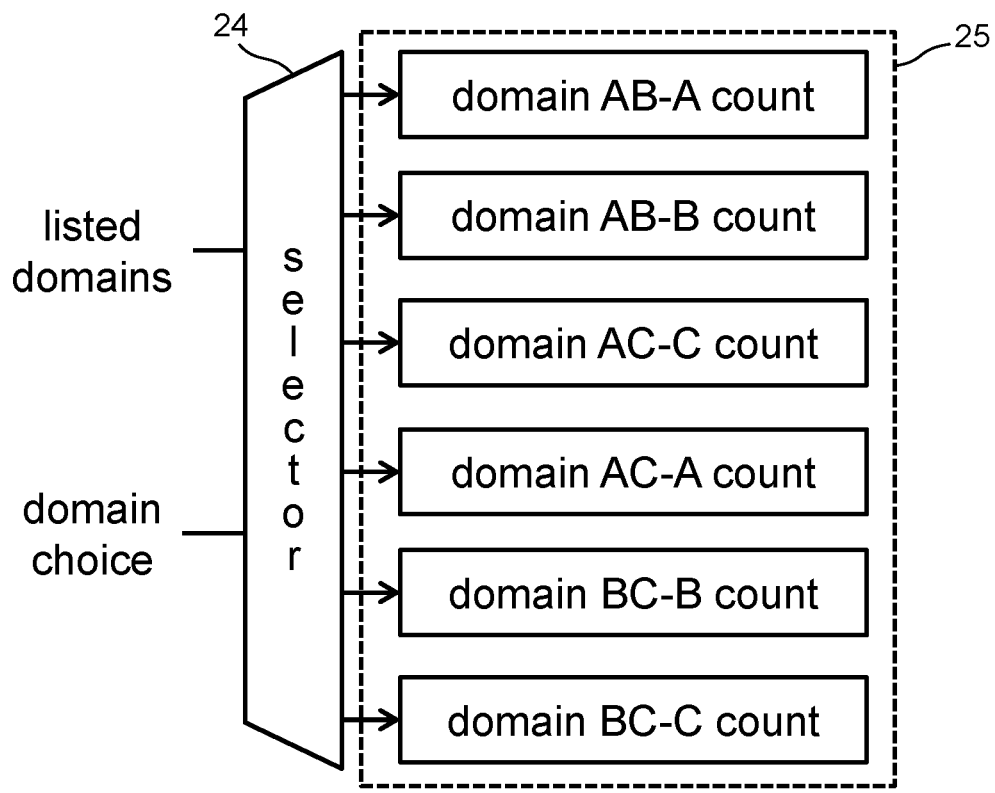

FIG. 2B shows gathering statistics according to an embodiment. Each time a user makes a domain choice based on a list of two out of three domains, selector 24 uses the set of listed domains and the domain choice to choose the appropriate counter to increment. There is a counter corresponding to each domain choice for each combination of domains on the list. A counter array 25 stores all of the counts. For example, the counter domain AB-A count is incremented when domains A and B are listed and the user chooses domain A.

Figure 3:
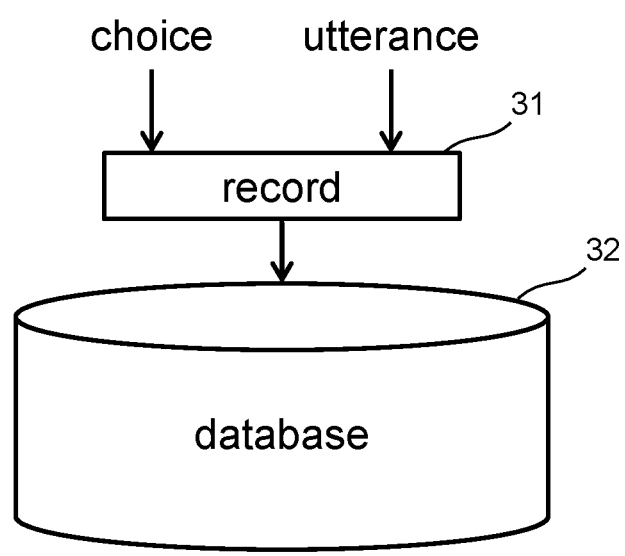
FIG. 3 illustrates storing records of choices related to utterances, according to an embodiment of the invention.

FIG. 3 shows storing utterances and the resulting user choice of relevant domain as records 31 in a database 32. Various embodiments represent utterances as one or more of: digital audio samples; tokenized sequences of phonemes such as textual transcriptions; and interpretation data structures. System designers and authors of domain-specific semantic grammars can use the user disambiguation choices to improve their grammar processing. Machine learning systems can process large amounts of data from the database, the data comprising alternative representations of an utterance, to train domain scoring based on user disambiguation choices, such as for neural network algorithms to automatically identify a most likely domain for an utterance with minimal or no user interaction.

Some embodiments store environment information in database records. Some examples of environment information are the location of the user when making the utterance, the date and time of the utterance, the time of day of the utterance, and the identity of the user (user ID) who made the utterance.

Some embodiments store a record of the most recently used domain. When providing a list of domains for disambiguation, such embodiments put the most recently used domain at the top of the list. Some such embodiments accept a user response during the time of delivering the list with the disambiguation request. As soon as the user responds with a choice, the system terminates providing the list. By putting providing the most recently used domain first, the system saves the user time by not making the user wait through a list to choose the intended domain.

Some embodiments store an ordered list of all domains. Each time a domain is used, the system moves it to the top of the order. When providing a list of domains to the user for disambiguation, such systems provide the list in the stored order.

Behaviors in Different Scenarios

Figure 4:
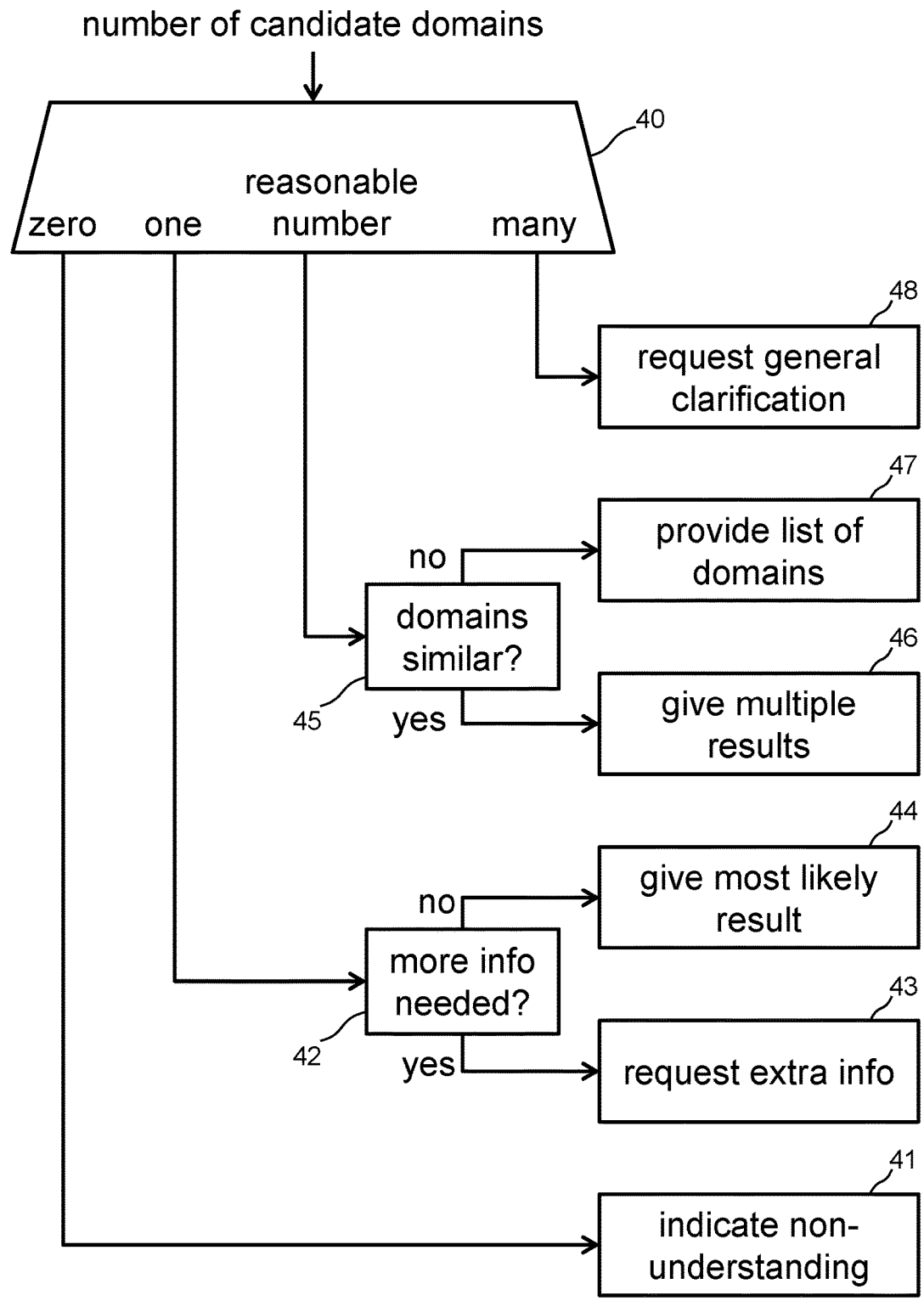
FIG. 4 illustrates a method of providing a variety of disambiguation techniques within the overall flow depicted in FIG. 1A, according to an embodiment of the invention.

Some embodiments respond to different kinds of ambiguous utterances in different ways. FIG. 4 illustrates a method of providing a variety of responses, according to an embodiment of the invention.

The method of FIG. 4 begins with a count of the number of candidate domains. It uses that count, in step 40, to cause the system to behave in one of six ways: requesting general clarification, giving multiple results, providing a list of domains and asking the user to choose, as in the method of FIG. 1A, requesting specific extra information, giving the result according to the most likely intended interpretation, and indicating non-understanding of the utterance.

If there are zero candidate domains, which is the case when none of the domains is assigned a relevancy score greater than the associated domain's threshold, then the method indicates that the system did not understand the utterance (41). For example, the utterance, "Fettuccine multitude churn juice romans atrium volts" is not grammatically correct or meaningful in any domain, so it would have a low relevancy score in all domains. To indicate non-understanding, for example, the system may tell the user, "I'm sorry. I cannot do that yet." or "I'm sorry. I do not understand." Some embodiments with visual displays may display the result from performing a web search engine search on the utterance (for example, using a textual transcription of the utterance). At this point, processing this utterance terminates.

If there is exactly one candidate domain, then in step 42, the system may proceed to consider whether the utterance has enough information for the system to form a result. For example, an utterance such as, "Send a message.", does not have enough information for a system to form a useful result. If further information is needed, then in step 43 the user is prompted for the additional information needed. For example, the system may request specific extra information, such as, "To whom would you like to send a message, and what would you like the message to say?"

If there is exactly one domain and the utterance requires no extra information for the system to form a result, then the one candidate domain is chosen as the domain to use in step 44. For example, and utterance such as "Does a cat have a tail?" needs no further information for the system to determine the answer and create a result that responds in saying, "Yes.". Utterances that are very specific, such as, "Is it raining in Alexandria Va., right now?" are unambiguous. Only one domain, such as a weather domain, will have its score above its threshold.

If the number of candidate domains is at least 2 and less than or equal to a maximum number of domains that is reasonable to present to the user, the system proceeds to step 45. For example, the maximum number of domains that is reasonable for presenting to the user may be 2, 3, 4, 5, or more. In some embodiments the maximum is variable. The value of the maximum number of domains that is reasonable for presenting to the user may depend on the type of system and, in some systems, depends on location, time of day, user ID, and other environment information. Some systems in cars, for example, need to avoid the delay of many steps of disambiguation, and so ask for general clarification if three or more domains have scores above their thresholds, whereas some home assistant systems, used during a relaxed evening, only request general clarification if six or more domains are above their thresholds.

In some embodiments, if step 45 determines that all of the domains are related, rather than providing a list of domains and asking the user for disambiguation, the system proceeds to step 46. It provides multiple results. If step 45 determines that domains on the list are unrelated, the system proceeds to step 47 and provides a list to the user and requests disambiguation as illustrated in FIG. 1B. Deciding to use all of the domains considers the amount of similarity between the candidate domains and the amount of similarity between concepts expressed in the utterance. For example, for an utterance "What's the capitol of Georgia?", a domain of information about countries and a domain of information about US states would both give scores above their thresholds since 'Georgia' is the name of a US state and the name of a country. In such a scenario, step 45 identifies these two candidate domains as having similar concepts because both are related to geography. The system may respond with multiple results, such as, "Tbilisi is the capital of the country of Georgia, and Atlanta is the capital of the U.S. state of Georgia." For an utterance such as, "How high is Denver, Colo.?", both a weather domain and a geography domain have a score above their thresholds. Though the domains are not closely related, since the concept of 'Denver, Colo.' is the same in both domains, the system may proceed to respond with multiple results, such as, "Denver is one mile high, and its high temperature is negative 40 degrees."

Examples of utterances that may be relevant to a reasonable number of dissimilar domains, and therefore require a disambiguating request include:

"What's the top performer today?", which would receive a disambiguation request,
"Do you mean stocks or music?"
"Where did Brian Wilson play in 2006?", which would receive a disambiguation request, "Brian Wilson of the Beach Boys or Brian Wilson the pitcher for the Giants and Dodgers?"
"How hot should you make chili?", which would receive a disambiguation request,
"Temperature hot or spicy hot?".

If the number of candidate domains exceeds a number that can be reasonably presented to the user so that the user can choose one of the presented domains, then the system proceeds to step 48. For example, the system may respond to the user after receiving an utterance such as "Toyota Tacoma" by asking for general clarification, such as, "Please can you be more specific?" Some systems use information from the utterance, such as, "What would you like to know about 'Toyota Tacoma'?" Another example would be responding to an utterance "Turkey" that may be assigned a high score in domains for animals, recipes, geography, history, news, weather, and sports since the utterance is meaningful in all of those domains.

Some systems, after asking for general clarification, treat the next utterance as a new one. Some systems, after asking for general clarification add the information from the response utterance to the utterance that required clarification in order to build a correct interpretation. By doing so, the system would interpret a next utterance, "How reliable is it?" as referring to 'Toyota Tacoma' pickup trucks, and give a result from a data source of automotive consumer reviews.

Utterances that use common acronyms, even within a single domain, tend to have many possible interpretations that require clarification. For example, in the utterance, "Where's CSU?", the acronym, 'CSU', might refer to Colorado State University, or California State University, among others. In the case of California State University, it has 23 different campus locations.

Some embodiments apply localization and user profiling to determining behavior in different scenarios. Localization can include determining specific ranges of global position and also type of environment, such as in a home, an office, or a vehicle. Profiling can include personal information such as age, gender, race, home address and also information such as recently used domains, specific keywords, and incoming messages. Some embodiments apply localization and profiling information values as weights to domain hypotheses. For example, some embodiments, for male users, weight the sports domain positively and the fashion domain negatively. Some embodiments weight the skiing domain positively for users in mountainous areas and the swimming domain positively for users in beach areas. Some embodiments apply localization and profiling information values as weights that scale the number of domains that is reasonable to present for a user choice. For example, some embodiments decrease the number of candidate domains for disambiguation to two for users that are in a car so as to cause a request for general clarification rather than a long list of choices that could distract a driver, even if the number of choices is acceptable to a rider on a train. Some embodiments apply localization and profiling information values to the computations of domain similarity.

Client Server Model

Figure 5:
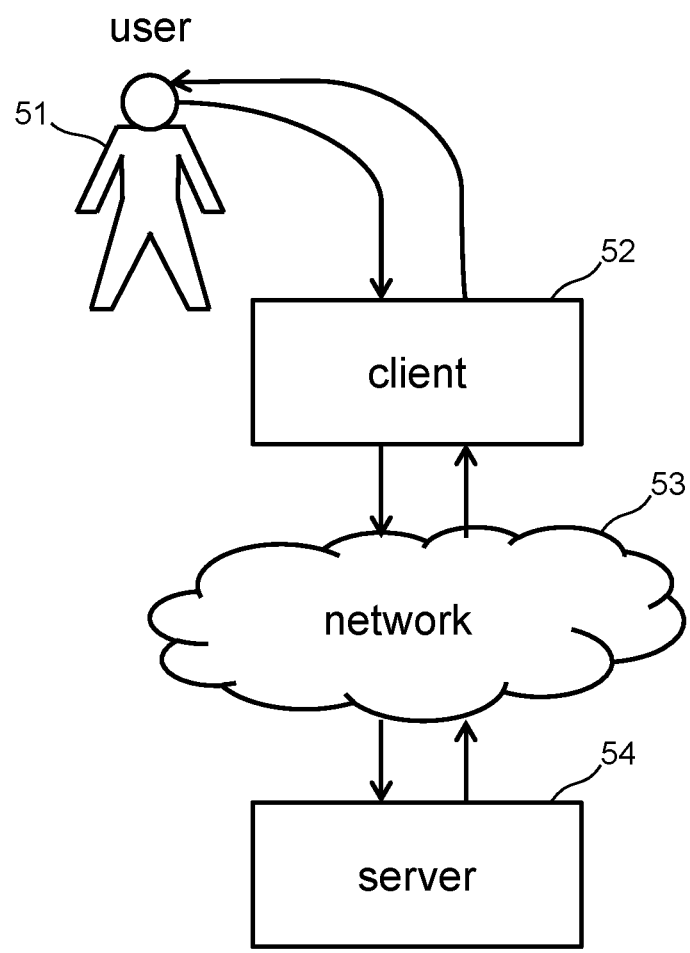
FIG. 5 illustrates the relationship between a user, client, and server, according to an embodiment of the invention.

FIG. 5 shows an embodiment that uses a client-server interface. A user 51 speaks utterances to client 52, which receives utterances using a microphone. The user also hears spoken responses from the client through a speaker. The client 52 communicates through a network 53, such as the Internet, to a server 54. The server processes the utterances according to the grammar rules of various domains.

Figure 6:
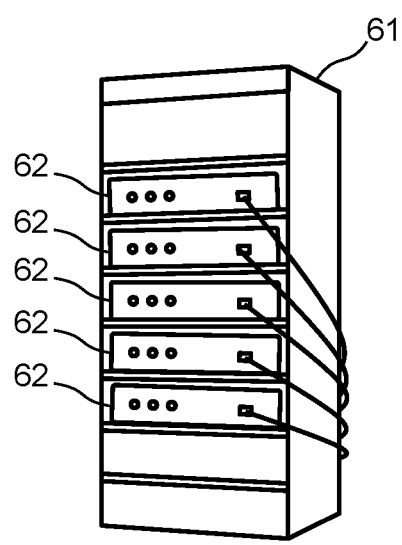
FIG. 6 illustrates a server, according to an embodiment of the invention.

FIG. 6 shows an embodiment of a server. The server comprises a rack 61 and five server blades 62.

Figure 7:
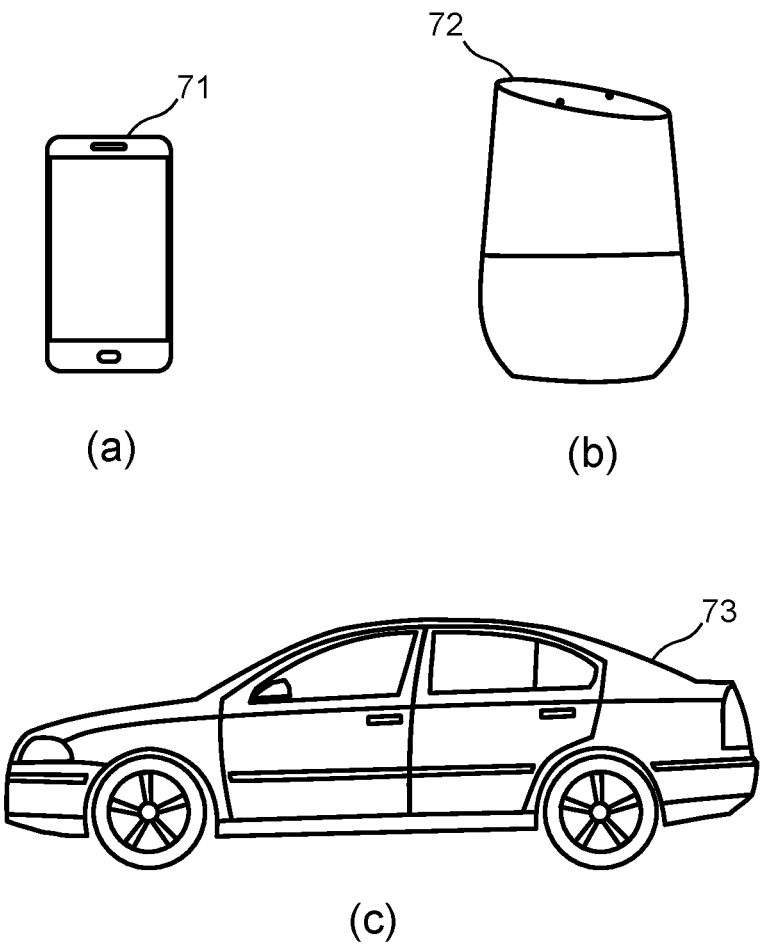
FIG. 7 illustrates clients, according to embodiments of the invention.

FIG. 7 shows three examples of clients. FIG. 7a shows a mobile phone 71. Because mobile phones are battery-powered, it is important to minimize complex computations so as not to run down the battery. Therefore, mobile phone 71 may connect over the Internet to a server. A mobile phone has a visual display that can provide information in some use cases. However, a mobile phone also has a speaker, and in some use cases a mobile phone may respond to an utterance using only speech.

FIG. 7b shows a home assistant device 72. It may plug into a stationary power source, so has power to do more advanced local processing than a mobile phone. Like phone 71, home assistant device 72 may rely on a cloud server for interpretation of utterances according to specialized domains and in particular domains that require dynamic data to form useful results. Because home assistant device 72 has no display, it is a speech-only device.

FIG. 7c shows an automobile 73. The automobile may be able to connect to the Internet through a wireless network. However, if driven away from an area with a reliable wireless network, the automobile 73 must process utterances, respond, and give appropriate results reliably, using only local processing. As a result, the automobile runs software locally for natural language utterance processing. Though many automobiles have visual displays, to avoid distracting drivers in dangerous ways, the automobile 73 provides results with speech-only requests and responses.

Automotive Systems

Requirements for human machine interfaces in automobiles are especially demanding due to the need for the machine's systems to operate safely, even when operated by non-professionals. Automobiles also present especially difficult environments because they can move, with windows open, near other noisy vehicles through reverberating tunnels. However, whereas some other speech-enabled systems are small devices with one or several closely spaced microphones that have to receive speech from any direction, automobiles surround the people making utterances. Therefore, automobiles have surrounding microphones to receive utterances, and they use their separation distance to cancel noise and detect which of multiple people is speaking. Since mobile phones are personal, identifying one of many speakers, though difficult, is not usually a concern.

Some providers manufacture and sell electronic subsystems to the automobile industry. The amount of electronics in vehicles is increasing rapidly. Many such subsystems are made of hardware and software platforms that enable programmers to develop, maintain, and enhance useful functions. Some automotive platforms include hardware or software submodules that enable the automobile to act as a speech-enabled device. Some embodiments of automotive platforms include a speech capture module. The speech capture module receives audio from microphones, runs a noise reduction algorithms, performs echo cancellation, and performs speaker voice isolation.

The embodiment further comprises a speech recognition module. It uses the processed audio from the speech capture module to generate one or more hypothesized sequences of phonemes, and a score indicating the strength of each hypothesis. The speech capture module proceeds to compute tokenizations of the hypothesized phoneme sequences according to a statistical language model to produce transcriptions or phonetic word sequences. Some embodiments rely on servers, accessible through a network connection, to assist, while other embodiments perform all speech recognition functions locally. The speech recognition module uses the word sequence from one or more scored hypotheses from the speech recognition module to interpret utterances according to the grammar rules of a plurality of domains. It computes a relevancy of the word sequence according to each grammar rule within the domain, and weights that by the hypothesis likelihood score from the speech recognition module. The speech recognition module uses the interpretation according to the highest scoring grammar rule to provide the interpretation and score for the domain. The speech recognition module proceeds according to embodiments described above, to choose an interpretation or request and receive a disambiguation choice from a user within the automobile.

Automotive platforms use the chosen interpretation to invoke various functions as the result of utterances. Some such functions are perform navigational operations, operate other automobile subsystems such as the heater or windows, and respond to queries such as ones for weather or traffic conditions.

According to some embodiments, automotive platforms further comprise a speech generation module. The speech recognition module invokes the speech generation module to request disambiguation according to embodiments described above. Furthermore, the speech recognition module invokes the speech generation module to provide informational results, such as weather conditions, and conformational results, such as that the heater setting has changed according to a command utterance.

In various embodiments, functions performed by the speech capture module, speech recognition module, and speech generation module are performed within different instances of such modules.

Figure 8:
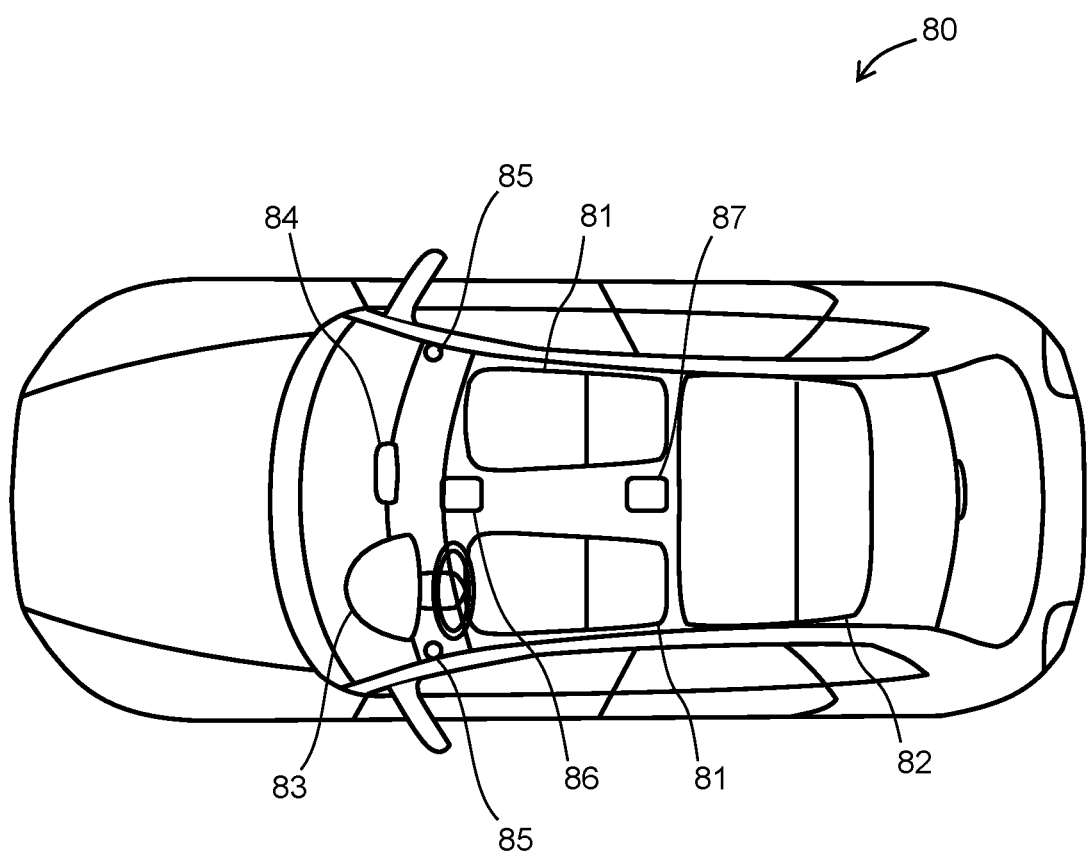
FIG. 8 illustrates an overhead view of an automobile, according to an embodiment of the invention.

FIG. 8 shows an overhead view of an automobile 80 designed for operation on the right side of roads with a driver seated on the left side of the automobile. The automobile 80 has two front seats 81, either of which can hold one person. The automobile 80 also has a back seat 82 that can hold several people. The automobile 80 has a driver information console 83 that displays basic information such as speed and energy level. The automobile 80 also has a dashboard console 84 for more complex human interactions that cannot be quickly conducted by speech, such as viewing and tapping locations on navigational maps.

The automobile 80 has side bar microphones 85 and a ceiling-mounted console microphone 86, all of which receive speech audio such that a digital signal processor embedded within the automobile can perform an algorithm to distinguish between speech from the driver or front-seated passenger. The automobile 80 also has a rear ceiling-mounted console microphone 87 that receive speech audio from rear-seated passengers.

The automobile 80 also has a car audio sound system with speakers. The speakers can play music buy also produce speech audio for spoken responses to user commands and results. The automobile 80 also has an embedded microprocessor. It runs software stored on non-transitory computer readable media that instruct the processor to perform the algorithm of FIG. 1, among other functions.

Computer Implementations

Some embodiments use a client and server connected through a network where users interact with the client, but the server processes the utterances and interprets their meanings. Some servers are racks of processors in data centers, and can process utterances from many clients and many users simultaneously. Some embodiments perform all processing locally on the same device that captures an utterance directly from the user.

Many types of user-interactive devices are available such as smartphones, home automated assistant devices, and automobiles. Some mobile devices such as automobiles and smartphones can be used only as a client when they are within range of a mobile network that connects to a server, but can use a local-only method when out of range of a mobile network. Automobiles present particularly challenging requirements for conventional systems, and especially benefit from the invention, because safe operation requires that no display is necessary and that users not be distracted, confused, or frustrated.

Figure 9:
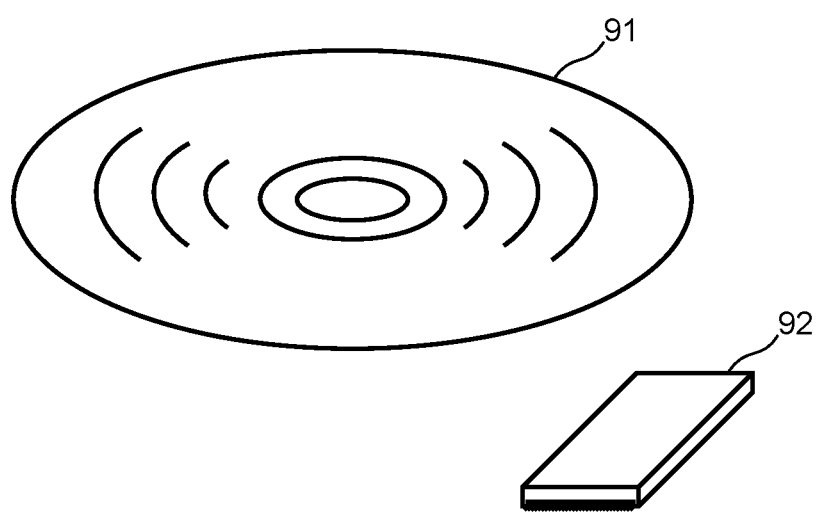
FIG. 9 illustrates non-transitory computer readable media, according to embodiments of the invention.

FIG. 9 shows examples of non-transitory computer readable media appropriate for various embodiments. Some embodiments use a magnetic disk platter 91 to store and provide computer code. Some embodiments use a Flash RAM storage device 92 to store and provide computer code.

Figure 10:
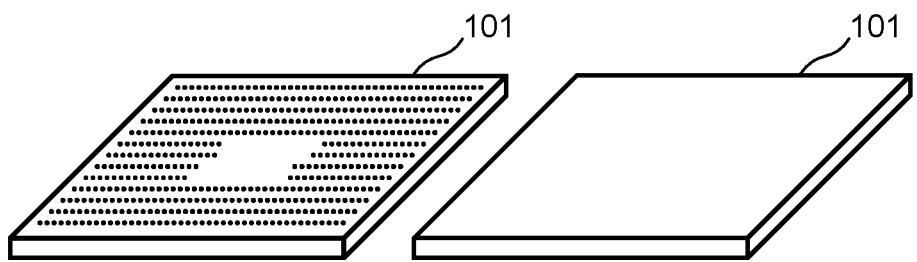
FIG. 10 illustrates system-on-chip packages, according to an embodiment of the invention.

FIG. 10 shows packaged system-on-chip devices 101 in two orientations. The devices have a ball grid array to attach to a printed circuit board that provides couplings to microphones, speakers, network connections, non-transitory computer readable media, and other input/output devices. In FIG. 10 one orientation shows the ball grid array and the other orientation shows the side of a device facing away from the printed circuit board.

Figure 11:
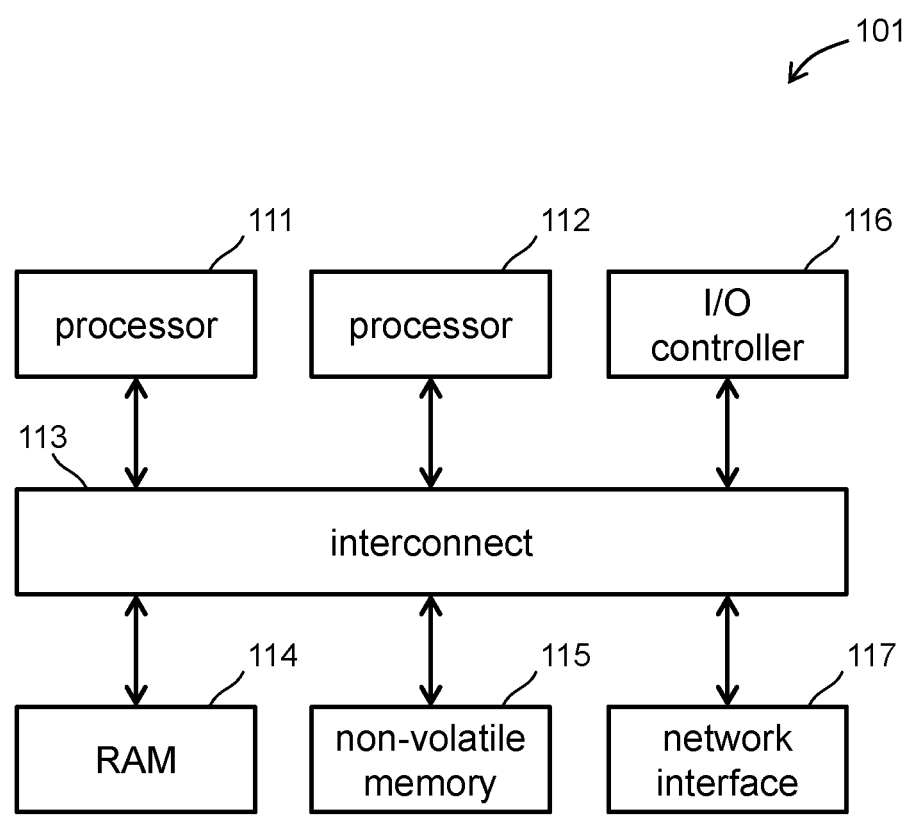
FIG. 11 illustrates modules within a system-on-chip, according to an embodiment of the invention.

FIG. 11 shows a block diagram of the hardware functional modules within system-on-chip device 101. The device 101 comprises two computer processors 111 and 112. In some embodiments, the processors conform to an ARM instruction set architecture. In some embodiments, the processors conform to an x86 instruction set architecture. An interconnect 113 couples the processors 111 and 112 to other hardware modules. One module is an interface controller to random access memory (RAM) 114. Another module is an interface to non-volatile memory 115, such as Flash RAM and magnetic hard disk drives. One module is an I/O controller interface 116 that provides for coupling the system-on-chip to microphones, speakers, displays, and manual input devices. One module 117 is an interface to networking devices, such as wireless network modems and Ethernet ports that can couple the system-on-chip 101 to remote servers via the Internet.

Some embodiments may be performed on a general-purpose computer system with multiple chips and other components, such as illustrated in FIG. 12. FIG. 12 is a block diagram of an example of such a computer system. A computer system 1210 typically includes at least one processor 1214, which communicates with a number of peripheral devices via a bus subsystem 1212. These peripheral devices may include a storage subsystem 1224, comprising for example memory devices and a file storage subsystem, user interface input devices 1222, user interface output devices 1220, and a network interface subsystem 1216. The input and output devices allow user interaction with the computer system 1210. A network interface subsystem 1216 provides an interface to outside networks, including an interface to a communication network 125, and is coupled via the communication network 125 to corresponding interface devices in other computer systems.

User interface input devices 1222 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into a computer system 1210 or onto a communication network 125.

User interface output devices 1220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1210 to the user or to another machine or computer system.

The storage subsystem 1224 stores programming and data constructs that provide the functionality of some or all of the modules described herein, including the logic to create inferred queries for use as query suggestions according to the processes described herein. These software modules are generally executed by a processor 1214 alone or in combination with other processors.

Memory 1226 used in the storage subsystem can include a number of memories including a main random access memory (RAM) 1230 for storage of instructions and data during program execution and a read only memory (ROM) 1232 in which fixed instructions are stored. A file storage subsystem 1228 can provide persistent storage for program and data files, and may include a hard disk drive, a floppy disk drive along with associated removable media, a CD-ROM drive, an optical drive, or removable media cartridges. The modules implementing the functionality of certain embodiments may be stored by the file storage subsystem 1228 in the storage subsystem 1224, or in other machines accessible by the processor.

Bus subsystem 1212 provides a mechanism for letting the various components and subsystems of the computer system 1210 communicate with each other as intended. Although bus subsystem 1212 is shown schematically as a single bus, alternative embodiments of the bus subsystem may use multiple busses.

The computer system 1210 can be of varying types including a workstation, server, computing cluster, blade server, server farm, or any other data processing system or computing device. Due to the ever-changing nature of computers and networks, the description of the computer system 1210 depicted in FIG. 12 is intended only as an example for purposes of illustrating the preferred embodiments. Many other configurations of computer system 1210 are possible having more or fewer components than the computer system depicted in FIG. 12.

Embodiments and examples described in this application are not the only ones possible. Practitioners in the art will recognize other embodiments to serve various other applications.

What is claimed is:

1. A method of providing a result to a user of a speech-enabled system, the method comprising:
   using at least one computer to:
      interpret a natural language utterance according to a plurality of domains to automatically create both a particular interpretation and a corresponding relevancy score for each domain, where a domain represents a subject area and comprises a set of grammar rules, such that (i) a first particular interpretation of the natural language utterance has a particular meaning that is unique to a first domain of the domains and (ii) a second particular interpretation of the natural language utterance has a particular meaning that is both unique to a second domain of the domains and different from the particular meaning that is unique to the first domain;
      compare each relevancy score against a threshold for its domain to determine a list of candidate domains having relevancy scores exceeding their thresholds;
      present the list of candidate domains to the user, wherein the presented list only identifies domains having relevancy scores exceeding their thresholds;
      ask the user to choose a domain from the presented list;
      receive a choice of domain from the user;
      store the choice in a database;
      train a neural network implementing domain scoring, the neural network being trained by processing the database; and
      implement the trained neural network to automatically identify a most likely domain for a natural language utterance.

2. The method of claim 1 further comprising using the at least one computer to increment a value of a counter representing the chosen domain.

3. The method of claim 2 wherein the candidate domains are presented to the user in an order based on the value of the counter.

4. The method of claim 1 further comprising using the at least one computer to store an indication of the most recently chosen domain.

5. The method of claim 4 wherein the candidate domains are presented to the user in an order based on the indication of the most recently chosen domain.

6. The method of claim 1 further comprising:
   using the at least one computer to:
      store a record in a database, the record comprising:
         a representation of the natural language utterance; and
         the choice of domain for the utterance.

7. The method of claim 1 further comprising:
   using the at least one computer to:
      store a record in a database, the record comprising:
         the interpretation of the utterance according to the chosen domain; and
         the choice of domain.

8. The method of claim 1, wherein a particular threshold is assigned to each domain and at least two particular thresholds are different for at least two domains.

9. The method of claim 1, wherein audio speech is used to (i) present the list of candidate domains to the user and (ii) ask the user to choose the domain from the presented list.

10. A method of providing a result to a user of a speech-enabled system, the method comprising:
    using at least one computer to:
       interpret a natural language utterance according to a plurality of domains to automatically create both a particular interpretation and a corresponding relevancy score for each domain, where a domain represents a subject area and comprises a set of grammar rules, such that (i) a first particular interpretation of the natural language utterance has a particular meaning that is unique to a first domain of the domains and (ii) a second particular interpretation of the natural language utterance has a particular meaning that is both unique to a second domain of the domains and different from the particular meaning that is unique to the first domain;
       compare each relevancy score against a threshold for its domain to determine a number of candidate domains having relevancy scores exceeding their thresholds; and
       responsive to the number of candidate domains being greater than a maximum number of domains that is reasonable to present to the user for disambiguation, ask the user to provide a general clarification;
       receive a response utterance with clarification information to determine a domain;
       store the determined domain in a database;
       train a neural network implementing domain scoring, the neural network being trained by processing the database; and
       implement the trained neural network to automatically identify a most likely domain for a natural language utterance.

11. The method of claim 10 wherein the maximum number of domains that is reasonable to present to the user is based on environment information.

12. A non-transitory computer readable medium storing code that, when executed by at least one computer, causes the one or more computer to:
    interpret a natural language utterance according to a plurality of domains to automatically create both a particular interpretation and a corresponding relevancy score for each domain, where a domain represents a subject area and comprises a set of grammar rules, such that (i) a first particular interpretation of the natural language utterance has a particular meaning that is unique to a first domain of the domains and (ii) a second particular interpretation of the natural language utterance has a particular meaning that is both unique to a second domain of the domains and different from the particular meaning that is unique to the first domain;
    compare each relevancy score against a threshold for its domain to determine a list of candidate domains having relevancy scores exceeding their thresholds;

present the list of candidate domains to a user, wherein the presented list only identifies domains having relevancy scores exceeding their thresholds;
ask the user to choose a domain from the presented list;
receive a choice of domain from the user;
store the choice in a database;
train a neural network implementing domain scoring, the neural network being trained by processing the database; and
implement the trained neural network to automatically identify a most likely domain for a natural language utterance.

13. A speech-enabled system comprising:
means for performing disambiguation by:
interpreting a natural language utterance according to a plurality of domains to automatically produce a particular interpretation for each domain, where a domain represents a subject area and comprises a set of grammar rules, such that (i) a first particular interpretation of the natural language utterance has a particular meaning that is unique to a first domain of the domains and (ii) a second particular interpretation of the natural language utterance has a particular meaning that is both unique to a second domain of the domains and different from the particular meaning that is unique to the first domain;
determining that the natural language utterance is sensible in a plurality of domains;
asking a user for disambiguation;
receiving a response utterance with clarification information;
storing the clarification in a database;
training a neural network implementing domain scoring, the neural network being trained by processing the database; and
implementing the trained neural network to automatically identify a most likely domain for a natural language utterance.

14. An automotive platform comprising:
a speech capture module enabled to capture a spoken utterance from a user;
a speech recognition module that interprets the utterance according to a plurality of domains to automatically produce both a particular interpretation and a corresponding relevancy score for each domain, where a domain represents a subject area and comprises a set of grammar rules, such that (i) a first particular interpretation of the utterance has a particular meaning that is unique to a first domain of the domains and (ii) a second particular interpretation of the utterance has a particular meaning that is both unique to a second domain of the domains and different from the particular meaning that is unique to the first domain; and
a speech generation module enabled to produce speech, wherein, responsive to only relevancy scores exceeding an associated threshold, the speech generation module:
produces speech comprising a list of domains;
asks the user to choose a domain from the list
stores the choice in a database;
train a neural network implementing domain scoring, the neural network being trained by processing the database; and
implement the trained neural network to automatically identify a most likely domain for a natural language utterance.

* * * * *